Oct. 28, 1952   F. R. SCHULZ   2,615,642
STRIP WINDING SPOOL
Filed April 7, 1950
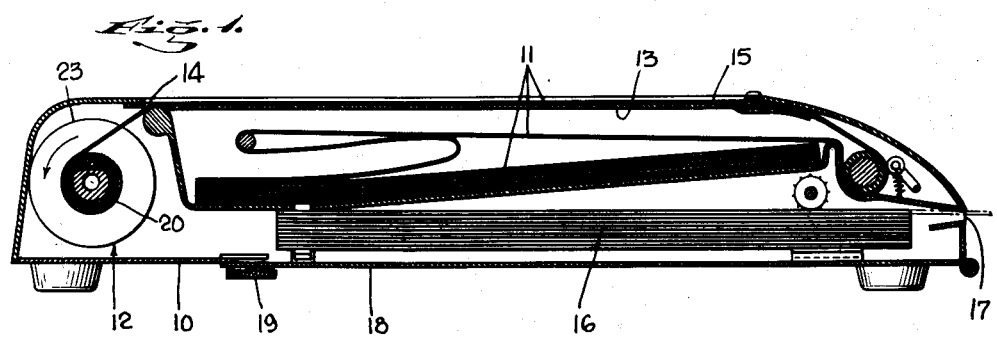
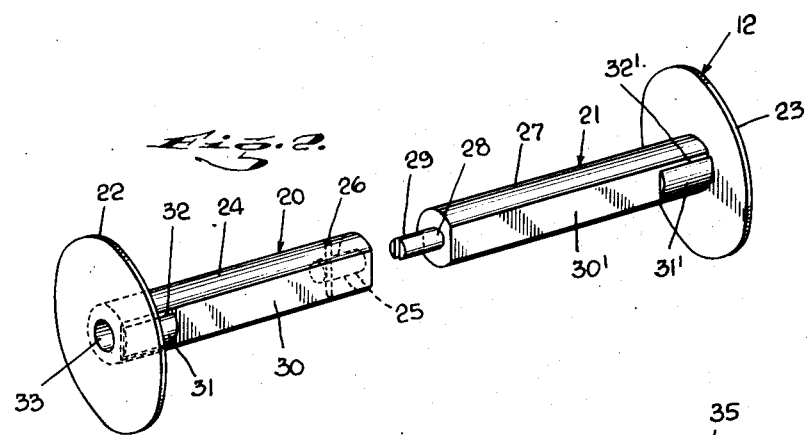
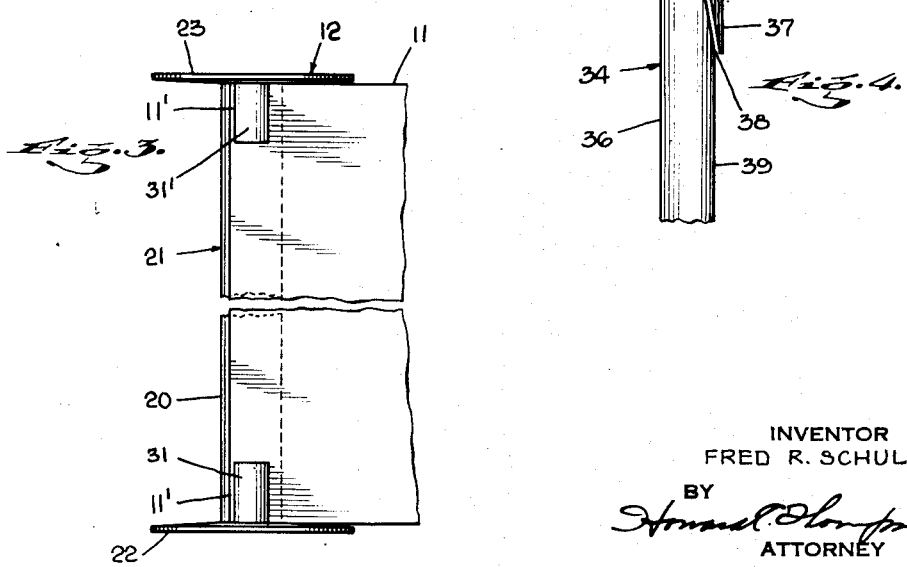
INVENTOR
FRED R. SCHULZ
BY
*Howard Thompson*
ATTORNEY Patented Oct. 28, 1952

2,615,642

UNITED STATES PATENT OFFICE 2,615,642

STRIP WINDING SPOOL

Fred R. Schulz, Berkeley Heights, N. J., assignor to Sondon Systems Corporation, Red Bank, N. J., a corporation of New Jersey Application April 7, 1950, Serial No. 154,522

3 Claims. (Cl. 242—70)

This invention relates to spools for winding strips of material, such for example as the winding of sales tickets of a locked copy writer. More particularly, the invention deals with a spool of the kind under consideration having means for quickly and easily attaching a strip end to the spool for securely supporting the same in the winding operation. Still more particularly, the invention deals with a spool composed of detachably coupled parts facilitating removal of the wound strip and re-use of the spool structure.

The novel features of the invention will be best understood from the following description, when taken together with the accompanying drawing, in which, certain embodiments of the invention are disclosed and, in which, the separate parts are designated by suitable reference characters in each of the views and, in which:

Fig. 1 is a diagrammatic sectional view through a locked copy sales ticket writer showing one of my improved spools mounted therein.

Fig. 2 is a perspective view of the spool showing the spool parts in detached relationship to each other.

Fig. 3 is a plan view of the spool illustrating the method of starting the edge of a sheet to be wound thereon with parts of the construction broken away; and Fig. 4 is a side view of one end portion of a spool showing a modification.

In Fig. 1 of the drawing, I have diagrammatically illustrated at 10 the casing of a locked copy writer of the kind under consideration, in which an elongated or more or less endless locked copy strip 11 is arranged in folded position and adapted to be wound onto a spool 12, after passage over a platform 13 of the writer.

Supported above the platform 13 and the strip 11 thereon is a carbon or transfer sheet 14 exposed through an opening 15 in the top of the casing. Sales tickets which are shown stacked at 16 in the casing are adapted to be discharged through an opening 17 in the casing one at a time for placement in the apertured portion 15 of the casing, so as to transfer recorded sales of a ticket 16 onto the strip 11, as will be apparent.

Suitable means are provided for filling the casing from time to time with re-fills of the tickets 16 through a hinged cover 18 having a suitable lock, diagrammatically seen at 19, for holding the cover in locked position.

In Fig. 2 of the drawing is shown a perspective view of the spool 12 with the parts of the spool in separated or exploded relationship to each other. The spool 12 is formed from two halves 20, 21, each having a disc 22, 23, respectively, at the ends thereof. The core portion 24 of the spool half 20 has, at its end, a socket 25, through the inner end portion of which passes a pin 26. The core 27 of the other spool part has, at its end, a projecting pin 28, slotted, as seen at 29, to engage the pin 26 in keying the cores 24, 27 against relative rotation when the spool halves 20, 21 are coupled together.

The cores 24, 27 have alined flat surfaces 30, 30' and the cores adjacent the discs 22, 23 have segment keepers 31, 31' spaced from the surfaces 30, 30', as seen at 32, 32' to receive side corner portion 11' of the strip or sheet 11, as clearly seen in Fig. 3 of the drawing. In other words, in initially threading the strip or sheet 11 through the machine, one end of the strip is placed upon the flat surfaces 30, 30' with the corner portions 11' arranged beneath the keepers 31, 31' in the slots or spaces 32, 32' in the manner illustrated in Fig. 3 and then the spool is rotated to wind an end portion of the strip or sheet on the core 24, 27, after which the spool is set in the machine in the position generally indicated in Fig. 1.

Ends of the spool, including the core portions thereof, will have sockets for mounting in the casing and one of these sockets is indicated at 33 in Fig. 2 of the drawing. This construction of spool facilitates mounting of strips or sheets of any type or kind on a winding spool without the need of providing tapered or tongue-like ends on a strip or sheet and, at the same time, a secure attachment of the strip or sheet to the spool is provided. In some instances and uses other than that here illustrated, this construction will effect a material saving in the strip material being wound.

In Fig. 4 of the drawing, I have shown a slight modification, wherein one end portion only of a complete spool is shown at 34; 35 represents the disc end of the spool, 36 the core, 37 a keeper, similar to the keepers 31, 31'. At 38 is known an angularly disposed slot or recess between the keeper 37 and the core 36 and, at 39, is indicated the flat surface, similar to the flat surfaces 30, 30'.

With the construction shown in Fig. 4, the corner portions, as at 11' in Fig. 3, will be flexed downwardly to a slight extent governed by angularity of the slot 38. This flexing will provide a quicker grip and hold of the strip on the spool, as will be apparent.

Having fully described my invention, what I claim as new and desire to secure by Letters Patent is:

1. A spool for quick removal of a strip or sheet wound thereon, said spool comprising a pair of spool halves, each half having a core with a disc at one end, means at adjacent end portions of the cores for detachably coupling and keying the same, the cores of said spool halves having alined flat surfaces, and the disc end portions of the cores having short slits registering with the flat surfaces for engaging corner portions of a strip or sheet to be wound on said spool.

2. A spool for quick removal of a strip or sheet wound thereon, said spool comprising a pair of spool halves, each half having a core with a disc at one end, means at adjacent end portions of the cores for detachably coupling and keying the same, the cores of said spool halves having alined flat surfaces, the disc end portions of the cores having short slits registering with the flat surfaces for engaging corner portions of a strip or sheet to be wound on said spool, said first named means comprising a slotted pin on one core, and a socket on the other core including a keying element for entering the slot in said pin.

3. A spool for quick removal of a strip or sheet wound thereon, said spool comprising a pair of spool halves, each half having a core with a disc at one end, means at adjacent end portions of the cores for detachably coupling and keying the same, the cores of said spool halves having alined flat surfaces, means at the ends of the flat surfaces for engaging corner portions of a strip or sheet to be wound on said spool, said last named means comprising slits extending from said discs a short distance onto cores and angularly to the axis of said cores, and the open ends of said slits being alined with the flat surfaces of the cores.

FRED R. SCHULZ.

REFERENCES CITED

The following references are of record in the file of this patent:

UNITED STATES PATENTS

| Number | Name | Date |
|---|---|---|
| 1,801,362 | Mueller | Apr. 21, 1931 |
| 2,137,502 | Nerwin | Nov. 22, 1938 |

FOREIGN PATENTS

| Number | Country | Date |
|---|---|---|
| 476,201 | Germany | May 11, 1929 |
| 501,543 | Germany | July 3, 1930 |